(12) United States Patent
Fuchs et al.

(10) Patent No.: US 12,169,481 B2
(45) Date of Patent: Dec. 17, 2024

(54) SYSTEM AND METHOD FOR SELF-EXPIRING DATA CONTENT

(75) Inventors: Gil Fuchs, Nes Tziona (IL); Noam Hagag, Newe Mivtah (IL)

(73) Assignee: Eraser App Ltd., Newe Mivtah (IL)

( * ) Notice: Subject to any disclaimer, the term of this patent is extended or adjusted under 35 U.S.C. 154(b) by 0 days.

(21) Appl. No.: 13/245,645

(22) Filed: Sep. 26, 2011

(65) Prior Publication Data
US 2013/0080479 A1    Mar. 28, 2013

(51) Int. Cl.
*G06F 16/20*    (2019.01)

(52) U.S. Cl.
CPC .................................. *G06F 16/20* (2019.01)

(58) Field of Classification Search
CPC combination set(s) only.
See application file for complete search history.

(56) References Cited

U.S. PATENT DOCUMENTS

| | | | |
|---|---|---|---|
| 7,356,564 B2 | 4/2008 | Hartselle et al. | |
| 8,254,278 B2* | 8/2012 | Sterman | H04L 12/66 370/252 |
| 2001/0002365 A1* | 5/2001 | Minakuchi et al. | 455/556 |
| 2003/0048884 A1* | 3/2003 | Mateu | 379/88.22 |
| 2005/0071435 A1* | 3/2005 | Karstens | H04L 9/40 709/207 |
| 2005/0155058 A1* | 7/2005 | Jung | G11B 19/025 725/38 |
| 2005/0278387 A1* | 12/2005 | Kamada | G06F 17/30575 |
| 2006/0184563 A1* | 8/2006 | Potter | G06F 17/30548 |
| 2007/0271242 A1* | 11/2007 | Lindblad | G06F 17/30923 |
| 2007/0282798 A1* | 12/2007 | Akilov | G06F 17/30595 |
| 2008/0034003 A1* | 2/2008 | Stakutis | G06F 17/30085 |
| 2008/0037062 A1* | 2/2008 | Omino et al. | 358/1.15 |
| 2008/0046413 A1* | 2/2008 | Tokie | 707/3 |
| 2008/0062997 A1* | 3/2008 | Nix | H04L 29/12066 370/395.2 |
| 2008/0096536 A1* | 4/2008 | Tonosaki et al. | 455/415 |
| 2009/0036163 A1* | 2/2009 | Kimbrell | H04M 1/2745 455/558 |
| 2010/0262668 A1* | 10/2010 | Piett et al. | 709/206 |
| 2011/0213756 A1* | 9/2011 | Chen | G06F 17/30359 707/684 |
| 2012/0173563 A1* | 7/2012 | Griffin | G06F 21/6245 707/769 |
| 2013/0159436 A1 | 6/2013 | Hartselle et al. | |

\* cited by examiner

*Primary Examiner* — Thu N Nguyen
(74) *Attorney, Agent, or Firm* — Downs Rachlin Martin PLLC

(57) ABSTRACT

A system and method for supporting self-expiring data content. In accordance with an embodiment, a data record can be associated with a future expiration date and/or time, which can be specified as either an absolute date or time, or a relative date or time. When the expiration date and/or time is reached, the data record and its associated data are automatically deleted from the system. Depending on the particular implementation, the deletion can be automatic or provide some form of confirmation or acknowledgement. In accordance with an embodiment, a user inputting the data can control the record's expiration date, such that data is only retained in the system for as long as the user reasonably expects the data to be useful to them. For example, in a mobile phone contacts implementation, a user can attach an expiration date to a particular contacts data record, and that record will only remain in their mobile phone for that desired period of time.

23 Claims, 5 Drawing Sheets

SYSTEM AND METHOD FOR SELF-EXPIRING DATA CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to data processing, and are particularly related to a system and method for supporting self-expiring data content.

BACKGROUND

As computer systems have become increasingly powerful and found utility in almost every aspect of modern life, a consequence of such growth is that the amount of data stored worldwide has similarly grown at an almost exponential rate. Databases must be continuously expanded to accommodate new data. Some of this data, such as brief personal messages, news stories, consumer transactions and advertisements, has value only contemporaneously, for a short period of time. Storing such data over the long-term provides negligible value, but in many instances storing the data, even if it means having to provide additional storage, is an easier task than trying to filter out unimportant information. This means that over time, many databases become bloated with unwanted, stale, and often inconsistent data. This is the general area that embodiments of the present invention are intended to address.

SUMMARY

Disclosed herein is a system and method for supporting self-expiring data content. In accordance with an embodiment, a data record can be associated with a future expiration date and/or time, which can be specified as either an absolute date or time, or a relative date or time. When the expiration date and/or time is reached, the data record and its associated data are automatically deleted from the system. Depending on the particular implementation, the deletion can be automatic or provide some form of confirmation or acknowledgement. In accordance with an embodiment, a user inputting the data can control the record's expiration date, such that data is only retained in the system for as long as the user reasonably expects the data to be useful to them. For example, in a mobile phone contacts implementation, a user can attach an expiration date to a particular contacts data record, and that record will only remain in their mobile phone for that desired period of time.

DETAILED DESCRIPTION

Disclosed herein is a system and method for supporting self-expiring data content. In accordance with an embodiment, a data record can be associated with a future expiration date and/or time, which can be specified as either an absolute date or time, or a relative date or time. When the expiration date and/or time is reached, the data record and its associated data are automatically deleted from the system. Depending on the particular implementation, the deletion can be automatic or provide some form of confirmation or acknowledgement. In accordance with an embodiment, a user inputting the data can control the record's expiration date, such that data is only retained in the system for as long as the user reasonably expects the data to be useful to them. For example, in a mobile phone contacts implementation, a user can attach an expiration date to a particular contacts data record, and that record will only remain in their mobile phone for that desired period of time.

Although generally described herein in the context of a database, with data records therein, the techniques described herein can be similarly used with other types of system and data storage, for example an enterprise email system with stored email messages, a web-based advertising system with stored advertisements, or a mobile device with stored contact information. The techniques are intended to be usable with storing any form of data storage system, and any form of data or information for which self-expiration of that data or information is desirable.

Figure 1:
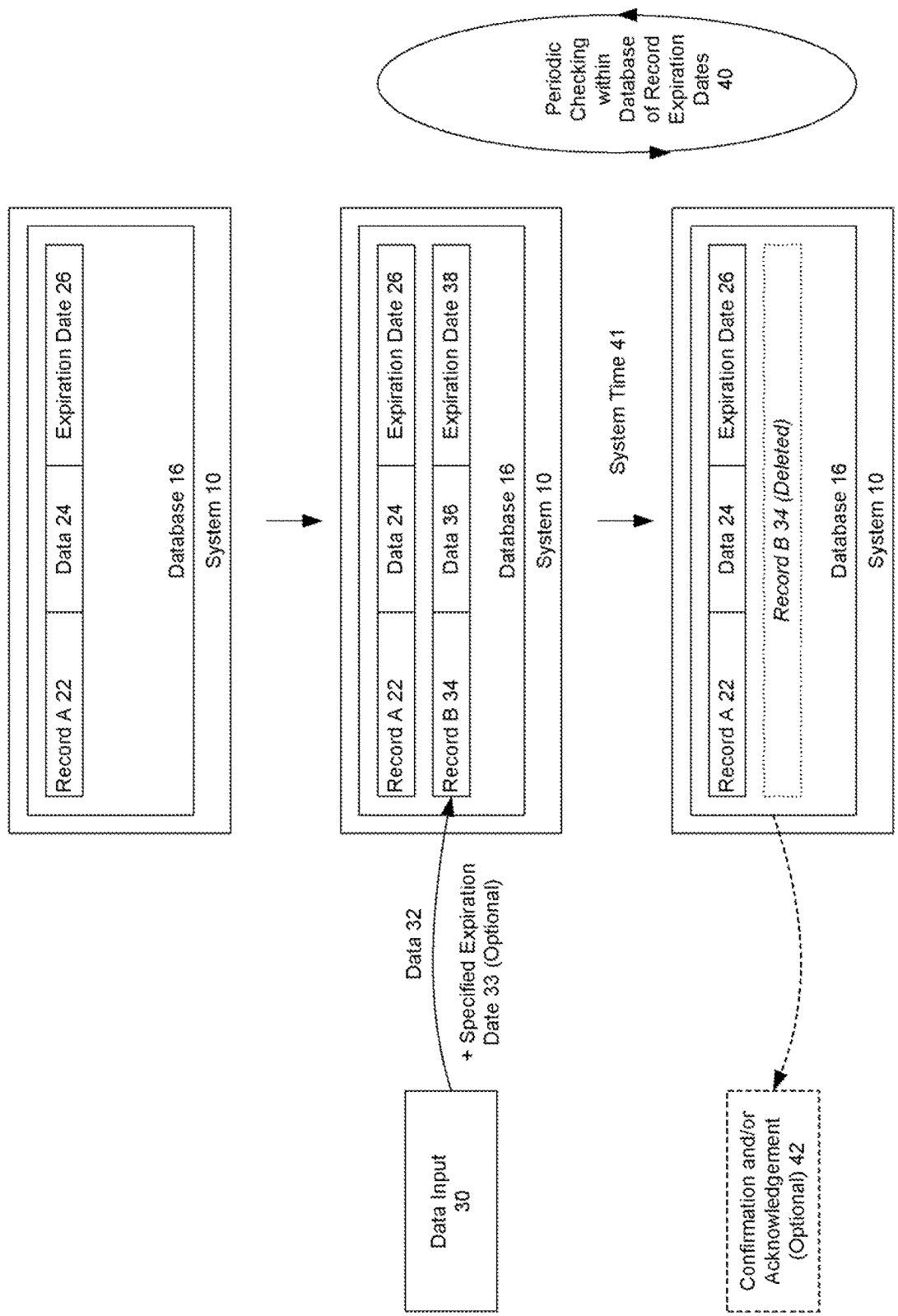
FIG. 1 shows a system for supporting self-expiring data content, in accordance with an embodiment.

FIG. 1 shows a system for supporting self-expiring data content, in accordance with an embodiment. As shown in FIG. 1, the system 10 can include a database 16 or other form of data storage, within which database each data record A 22 can include a data portion 24 and an expiration date portion 26.

In accordance with an embodiment, whenever a new record is added to the database, say manually by a user, or automatically by a computer process, or as any other form of data input 30, the data 32 in the data input can be used to populate the data portion 36 of the record (e.g. record b 34), while any optionally specified expiration date 33 in the data input can be used to populate the expiration date portion 38 of the record. Depending on the particular implementation, if an expiration date is not specified as part of the data input, the system can automatically determine and associate a default expiration date with the record, prior to storing the record in the database; or in some implementations set no expiration date with that particular record.

As further shown in FIG. 1, over time, the system (either via the operating system, the database logic itself, or using a record-expiring process) periodically checks 40 each of its database records' expiration dates, to determine whether that record has expired. Time can be measured based on an actual clock value, or on another time-dependent count. At any particular system time 41, if the system determines that a particular record has reached its expiration date, i.e. has expired, then that record is deleted from the system. In accordance with an embodiment, record expiration dates can also be pushed to a stack, and popped off as system time progresses, to indicate that the corresponding record should be deleted.

Depending on the particular implementation, a confirmation-to-delete and/or acknowledgement-of-deletion message 42 can be communicated to the user or computer process to inform them the record will be/has been deleted; otherwise the deletion of expired records is essentially silent.

Figure 2:
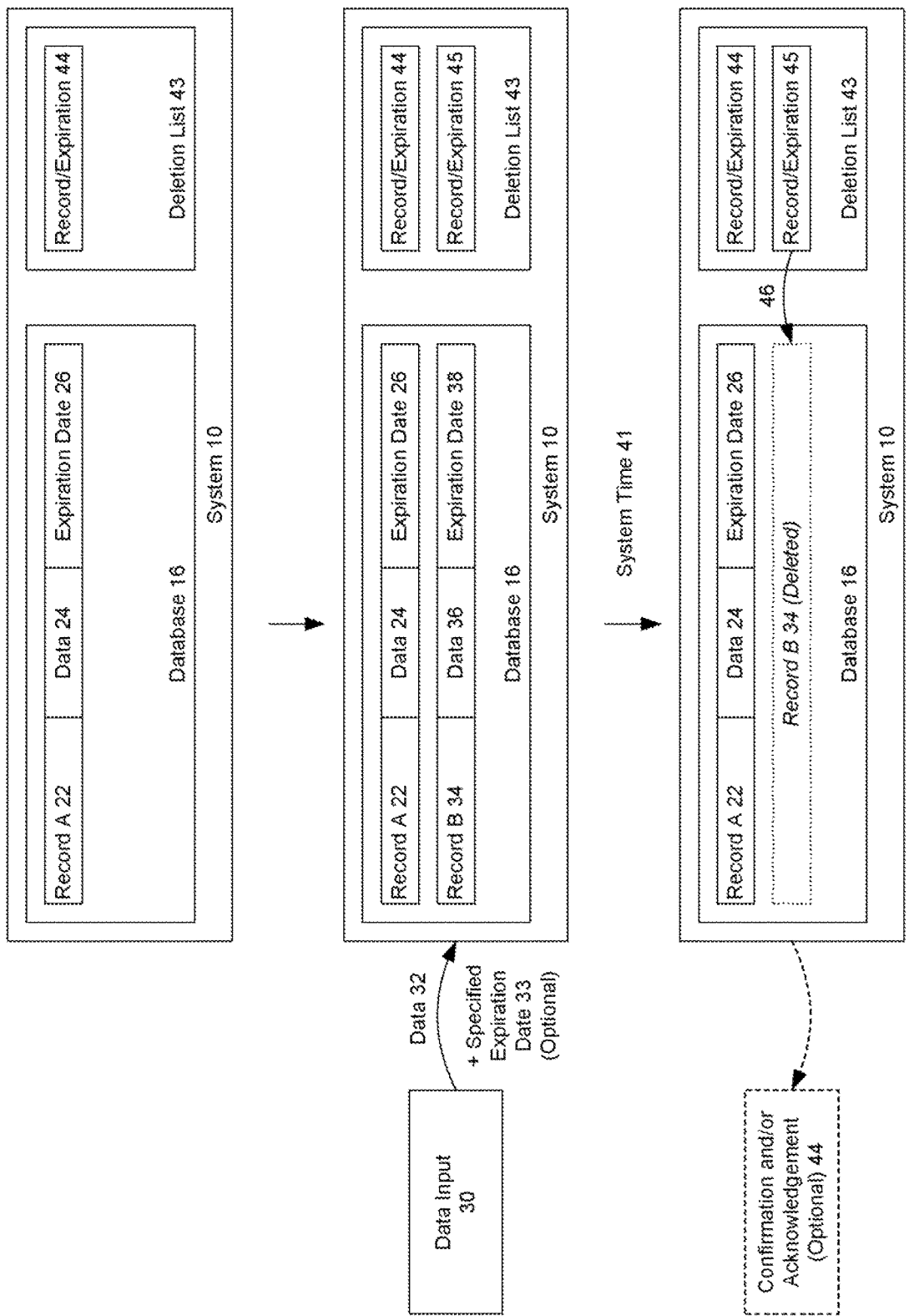
FIG. 2 shows a system for supporting self-expiring data content, in accordance with an alternative embodiment.

In accordance with various embodiments, instead of periodically checking each of the database records' expiration dates, to determine whether that record has expired, the system can use alternative methods to determine and delete expired records. For example, FIG. 2 shows a system for supporting self-expiring data content, in accordance with an alternative embodiment, wherein a deletion list 43 or similar set of information is maintained regarding records to-be-deleted and their expiration dates 44. As records to-be-deleted are added to the database, the deletion list is updated accordingly 45. As time progresses, the system can look to entries in the list for those records due to be expired, and delete 46 the record accordingly.

Figure 3:
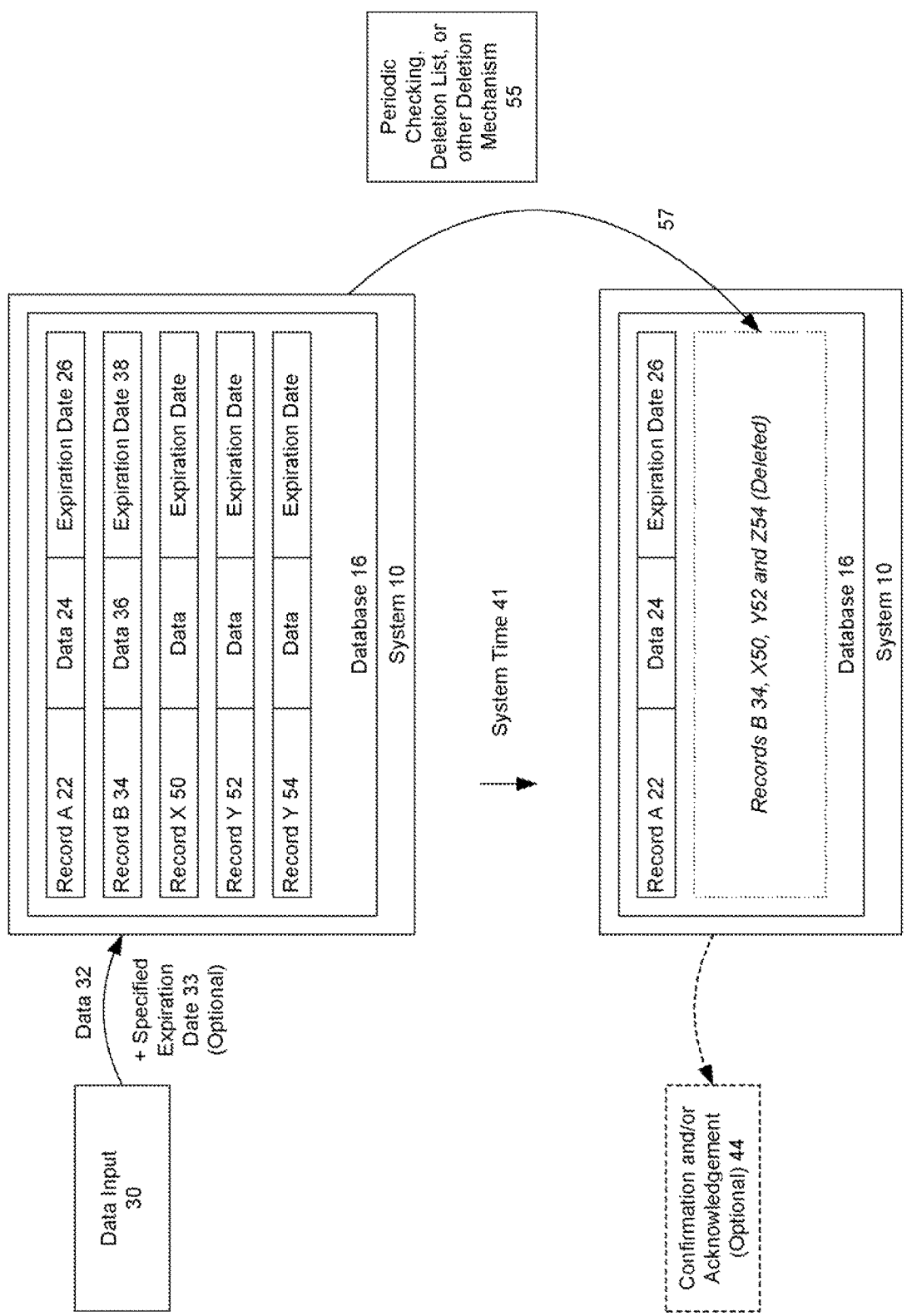
FIG. 3 shows a system for supporting self-expiring data content, in accordance with an alternative embodiment.

FIG. 3 shows a system for supporting self-expiring data content, in accordance with an alternative embodiment. As shown in FIG. 3, instead of deleting records one-by-one, in accordance with an embodiment, a periodic checking, deletion list, or other deletion mechanism 55, such as but not limited to the examples described above, can be used to determine groups of records to-be-deleted 50, 52, 54, and delete those in bulk, or as a group. In accordance with other embodiments other features can be employed, for example by considering a deletion buffer time during which the record is temporarily moved to a trash area, prior to being permanently deleted at some later point. The above are intended to be examples of various embodiments, and others may be developed within the spirit and scope of the invention.

Figure 4:
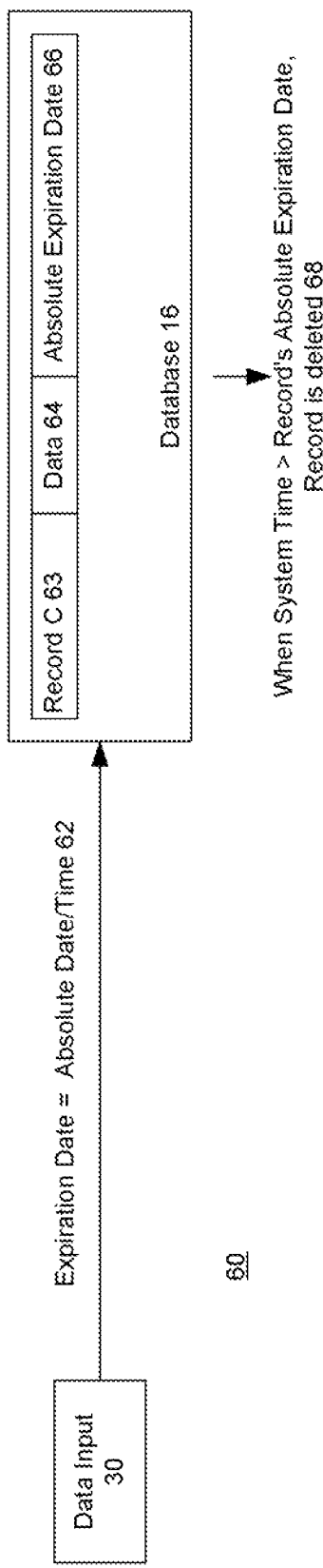
FIG. 4 illustrates the use of absolute record expiration date/times, in accordance with an embodiment.
Figure 5:
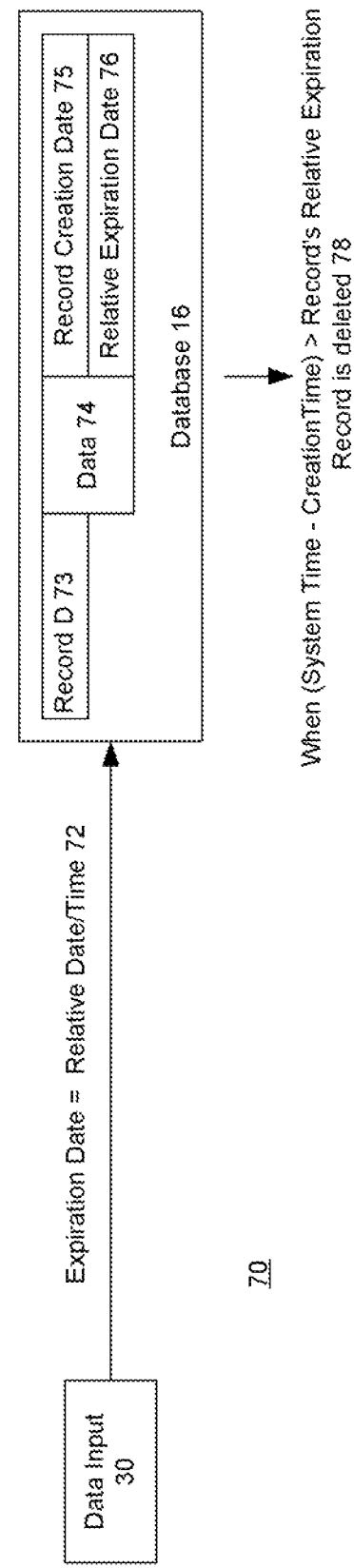
FIG. 5 illustrates the use of relative record expiration date/times, in accordance with an embodiment.

In accordance with some implementations, it may be desirable to store each record with an absolute record expiration date/time, which indicates a particular point in time at which that record is considered expired and should be deleted. FIG. 4 illustrates the use of absolute record expiration date/times 60, in accordance with an embodiment. As shown in FIG. 4, depending on the particular implementation, an absolute expiration date can be again either specified as part of the data input 62, or the system can automatically determine and associate an absolute expiration date with the record, prior to storing the record in the database. Each data record C 63 can include a data portion 64 and an absolute expiration date portion 66. At any particular system time, if the system determines that the system time is greater than that particular record's absolute expiration date, then the system determines that record has expired and is deleted 68 from the system In accordance with other implementations, it may be desirable to store each record with a relative record expiration date/time, which does not indicate a particular point in time at which that record is considered expired and should be deleted, but rather a desired lifetime that record should be allowed to persist within the system (such as a number of days, weeks, or years). FIG. 5 illustrates the use of relative record expiration date/times 70, in accordance with an embodiment. As shown in FIG. 5, depending on the particular implementation, an absolute expiration date can be again either specified as part of the data input 72, or the system can automatically determine and associate an absolute expiration date with the record, prior to storing the record in the database. Each data record D 73 can include a data portion 74, a record creation date portion 75, and a relative expiration date portion 76. At any particular system time, if the system determines that the system time, less the creation time, (i.e. the age of the record) is greater than that particular record's relative expiration date, then that record has expired and is deleted 78 from the system.

Figure 6:
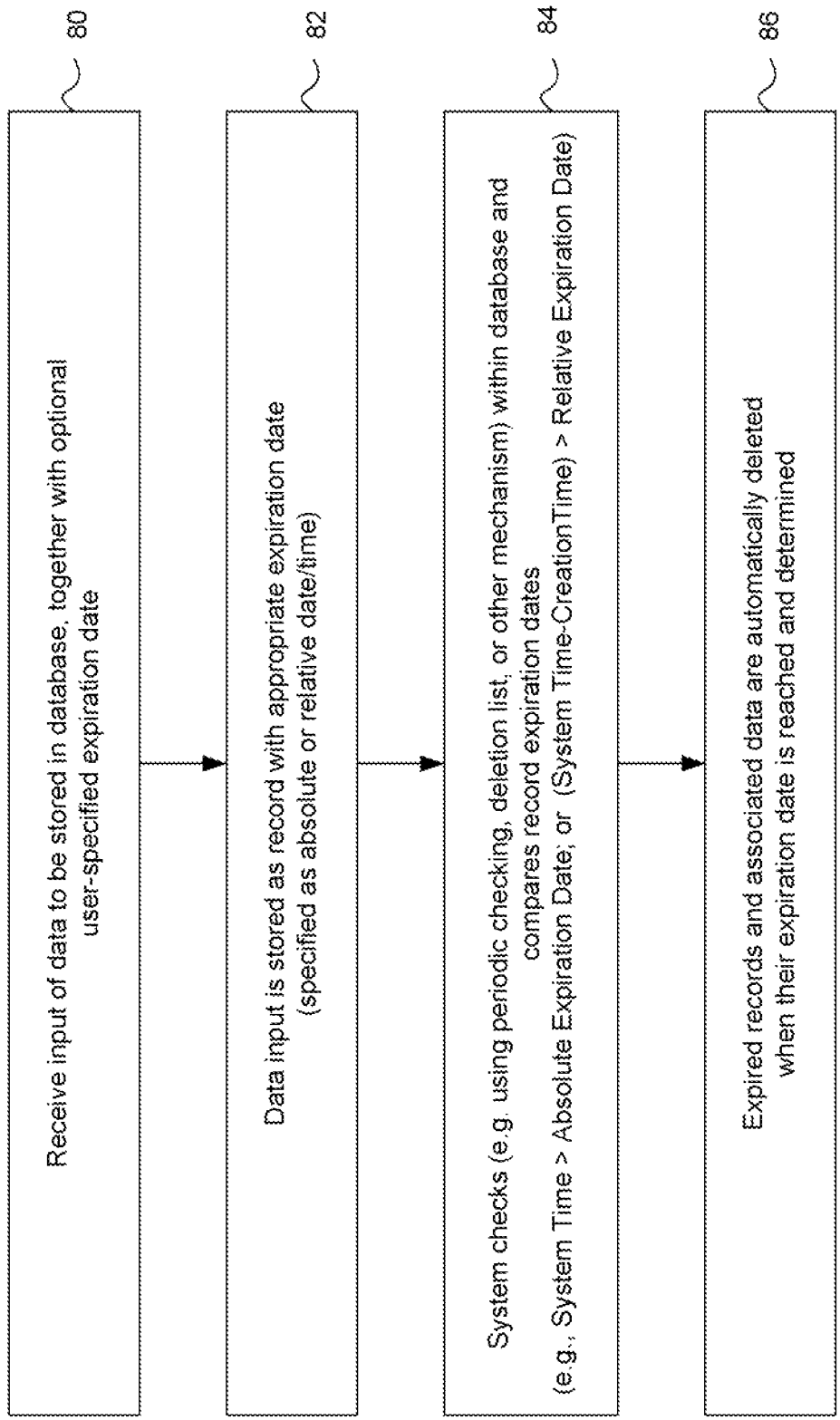
FIG. 6 shows a flowchart of a method for supporting self-expiring data content, in accordance with an embodiment.

FIG. 6 shows a flowchart of a method for supporting self-expiring data content, in accordance with an embodiment. As shown in FIG. 6, in step 80, the system receives input of data to be stored in database, together with any optional user-specified expiration date. In step 82, the data input is stored as a record with an appropriate expiration date (specified as either an absolute or a relative date/time). In step 84, the system checks (e.g. using periodic checking, deletion list, or other mechanism) within the database and compares record expiration dates (e.g., by comparing system time with absolute expiration dates; or record ages with relative expiration dates). In step 86, any expired records and their associated data are automatically deleted when their expiration date is reached and determined by the system.

Example Use Cases

In accordance with an embodiment, a user inputting the data can control the record's expiration date, such that data is only retained in the system for as long as the user reasonably expects the data to be useful to them. For example, in a mobile phone contacts implementation, a user can attach an expiration date to a particular contacts data record, and that record will only remain in their mobile phone for that desired period of time. This type of use case can be useful, e.g. while vacationing, so that contacts required only during that vacation period (hotel concierge contacts, restaurant or museum contacts) are automatically deleted following the vacation. Additional use cases can be developed.

The present invention may be conveniently implemented using one or more conventional general purpose or specialized digital computers or microprocessors programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system implemented on a microprocessor-based device for supporting self-expiring data content, comprising:
   a user created database, configured to store data records, wherein each data record includes a data portion and an expiration time portion;
   wherein said data record expiration time portion is configured to be modifiable by the user of the system to select or change or remove the content of said expiration time portion for each record at any time;
   wherein, periodically, the system compares the content of the expiration time portion in groups with a common expiration time to one of a present time or time interval and deletes data records wherein the contents of the expiration time portion indicate an expiration time that is before the present time or exceeds the time interval;
   wherein if contents of the expiration time portion are not provided by the user, the system is configured to automatically determine and associate a default expiration time with the data record, and populate the expiration time portion with said default expiration time prior to storing the data record in the database; and
   wherein said default expiration time may include no expiration time.

2. The system of claim 1, wherein each data record further includes an absolute record expiration time.

3. The system of claim 1, wherein each data record further includes a relative record expiration time.

4. The system of claim 1, wherein said microprocessor-based device comprises a mobile phone.

5. A method, implemented on microprocessor based device, of supporting self-expiring data content, comprising the steps of:
   providing a user created database, configured to store data records, wherein each data record includes a data portion and an expiration time portion;
   wherein the user of the system can select or change or remove the expiration time for each record at any time; and
   periodically comparing, via the microprocessor of the microprocessor-based device, each expiration time to one of a present time or time interval and deleting groups of data records with common expiration time that are before the present time or exceed the time interval.

6. The method of claim 5, wherein each data record has an absolute record expiration time.

7. The method of claim 5, wherein each data record has a relative record expiration time.

8. The method of claim 5, wherein if an expiration date is not specified as part of the data input, the method can automatically determine and associate a default expiration time with the data record, prior to storing the data record in the database, or set no expiration time with that particular data record.

9. The method of claim 5, wherein the method is used within a mobile phone implementation.

10. A non-transitory computer readable medium, including instructions stored thereon which when read and executed by a microprocessor based device cause the device to perform the steps comprising:
    providing a user created database with data input by a user, configured to store data records, wherein each data record includes a data portion and an expiration time portion;
    where the user of the system can select or change or remove the expiration time for each record at any time; and,
    periodically comparing groups of data records having common expiration times to one of a present time or time interval and deletes said groups of data records with expiration times that are before the present time or exceed the time interval.

11. The non-transitory computer readable medium of claim 10 wherein each data record has an absolute record expiration time.

12. The non-transitory computer readable medium of claim 10, wherein each data record has a relative record expiration time.

13. The non-transitory computer readable medium of claim 10, wherein if an expiration time is not specified as part of the data input, the system can automatically determine and associate a default expiration time with the data record, prior to storing the data record in the database, or set no expiration time with that particular data record.

14. The non-transitory computer readable medium of claim 10, wherein the instructions stored thereon are implemented on a mobile phone.

15. The system of claim 1, wherein the system, upon determining that a particular data record's expiration time has been reached, communicates one of a confirmation-to-delete or acknowledgement-of-deletion message, to a user or computer process, to inform that the data record is to be deleted.

16. The system of claim 1, wherein the system maintains the list of data records and their expiration times as a deletion list of data records to-be-deleted and their expiration times, including that, as the data records to-be-deleted are added to the database, the deletion list is updated accordingly, and over the period of time, the system reviews entries in the deletion list for those data records that are due to be expired, and deletes those data records.

17. The method of claim 5, further comprising, upon determining that a particular data record's expiration time has been reached, communicating one of a confirmation-to-delete or acknowledgement-of-deletion message, to a user or computer process, to inform that the data record is to be deleted.

18. The method of claim 5, further comprising maintaining the list of data records and their expiration times as a deletion list of data records to-be-deleted and their expiration times, including that, as the data records to-be-deleted are added to the database, the deletion list is updated accordingly, and over the period of time, reviewing entries in the deletion list for those data records that are due to be expired, and deleting those data records.

19. A database system, implementable on a microprocessor-based device, to support self-expiring data content, comprising:
    storage media in communication with the microprocessor-based device;
    instructions contained by said storage media, executable by the microprocessor-based device, wherein said instructions allow a user of the system to
      create a database within said storage media configured to store data records, wherein each data record includes a data portion and an expiration time portion; and
      select or change or remove the expiration time for each record at any time; and wherein said instructions cause the microprocessor-based device to
(i) periodically compare groups of data records with common expiration times to one of a present time or time interval and delete said groups of data records with common expiration times before the present time or exceeding the time interval; and
(ii) upon determining that a particular data record or group of data record's expiration time has been reached, communicate one of a confirmation-to-delete or acknowledgement-of-deletion message, to a user or computer process, to inform that the group of data records is to be deleted.

20. The database system of claim 19, wherein, said microprocessor-based device comprises a mobile phone and said storage media is contained within the mobile phone, and wherein said instructions further cause the mobile phone to maintain and update a deletion list of data records to-be-deleted with associated expiration times, and, over a period of time, review entries in the deletion list for data records due to be expired, and delete those data records.

21. The database system of claim 19, wherein said instructions further cause the microprocessor-based device to
(i) maintain a deletion list in which data records are associated according to contents of the expiration time portion so as to relate data records with a common expiration time;
(ii) update the deletion list as data records are changed, added or deleted in the database,
(iii) periodically compare each expiration time in the deletion list to one of a present time or time interval and delete as a group all data records with related expiration times before the present time or exceeding the time interval; and
(iv) upon determining that a particular expiration time in the deletion list has been reached, communicate one of a confirmation-to-delete or acknowledgement-of-deletion message, to a user or computer process, to inform that the associated data records are to be deleted.

22. A database system, implementable on a microprocessor-based device, to support self-expiring data content, comprising:
storage media in communication with the microprocessor-based device;
instructions contained by said storage media, executable by the microprocessor-based device, wherein said instructions allow a user of the system to
create a database within said storage media configured to store data records, wherein each data record includes a data portion and an expiration time portion;
select or change or remove the expiration time for each record at any time; and
wherein said instructions cause the microprocessor-based device to
(i) maintain a deletion list in which data records are associated according to contents of the expiration time portion so as to relate data records with a common expiration time;
(ii) update the deletion list as data records are changed, added or deleted in the database,
(iii) periodically compare each expiration time in the deletion list to one of a present time or time interval and delete as a group all data records with related expiration times before the present time or exceeding the time interval; and
(iv) upon determining that a particular expiration time in the deletion list has been reached, communicate one of a confirmation-to-delete or acknowledgement-of-deletion message, to a user or computer process, to inform that the associated data records are to be deleted.

23. A method, implemented on microprocessor-based device, of supporting self-expiring data content, comprising:
providing a user created database, configured to store data records, wherein each data record includes a data portion and an expiration time portion, wherein the user created database is configured to permit the user of the system to select or change or remove the contents of the expiration time portion for each record at any time in order to set an original or updated expiration time for the record;
maintaining a deletion list, via the microprocessor of the microprocessor-based device, in a storage of the microprocessor-based device by associating data records according to contents of the expiration time portion so as to relate data records with a common expiration time;
updating the deletion list, via said microprocessor, as data records are changed, added or deleted in the database,
periodically comparing, via said microprocessor, each expiration time in the deletion list to one of a present time or time interval and deleting as a group all data records with related expiration times before the present time or exceeding the time interval; and
upon determining that a particular expiration time in the deletion list has been reached, communicating, via said microprocessor, one of a confirmation-to-delete or acknowledgement-of-deletion message, to the user or to a computer process, to inform that the associated data records are to be deleted.

* * * * *